United States Patent
Qin et al.

(10) Patent No.: US 10,679,051 B2
(45) Date of Patent: Jun. 9, 2020

(54) METHOD AND APPARATUS FOR EXTRACTING INFORMATION

(71) Applicant: Baidu Online Network Technology (Beijing) Co., Ltd., Beijing (CN)

(72) Inventors: Shouke Qin, Beijing (CN); You Han, Beijing (CN); Zhiyang Chen, Beijing (CN); Feichao Ma, Beijing (CN); Peizhi Xu, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 15/564,187

(22) PCT Filed: Jun. 17, 2016

(86) PCT No.: PCT/CN2016/086213
§ 371 (c)(1),
(2) Date: Oct. 3, 2017

(87) PCT Pub. No.: WO2017/113645
PCT Pub. Date: Jul. 6, 2017

(65) Prior Publication Data
US 2018/0322341 A1    Nov. 8, 2018

(30) Foreign Application Priority Data

Dec. 30, 2015    (CN) .......................... 2015 1 1022937

(51) Int. Cl.
*G06K 9/00*    (2006.01)
*G06F 16/35*    (2019.01)
(Continued)

(52) U.S. Cl.
CPC ....... *G06K 9/00469* (2013.01); *G06F 16/353* (2019.01); *G06F 16/986* (2019.01);
(Continued)

(58) Field of Classification Search
CPC . G06F 7/00; G06F 17/22; G06F 17/30; G06F 17/218; G06F 17/2247;
(Continued)

(56) References Cited

U.S. PATENT DOCUMENTS

2004/0024739 A1* 2/2004 Copperman ...... G06F 17/30616
2008/0010056 A1* 1/2008 Zhou ................... G06F 17/2827
704/8

(Continued)

FOREIGN PATENT DOCUMENTS

CN    1786947    6/2006
CN    102651002    8/2012
(Continued)

OTHER PUBLICATIONS

McFarland, "JavaScript & JQuery, the missing manual," copyright @2014 (year: 2014).*

(Continued)

*Primary Examiner* — Justin S Lee
(74) *Attorney, Agent, or Firm* — Knobbe, Martens, Olson & Bear, LLP (57) ABSTRACT

The present application discloses a method and apparatus for extracting information. A specific implementation of the method comprises: parsing a pre-acquired web page file into a structure of a tag tree, and recognizing, in nodes of the tag tree, at least one body node at which a web page body in the web page file is located; performing a paragraph division on a content contained in the at least one body node to generate paragraph blocks, and setting a tag attribute for each paragraph block according to an attribute of a tag associated with the each paragraph block; classifying a text content contained in the each paragraph block based on the tag attribute of the each paragraph block; and extracting information comprising a question and an answer from the text content
(Continued)

contained in the each paragraph block based on a classification result. This implementation implements the automatic and precise extraction of information.

14 Claims, 6 Drawing Sheets

(51) Int. Cl.
*G06F 16/958* (2019.01)
*G06F 40/14* (2020.01)
*G06F 40/117* (2020.01)
*G06F 40/154* (2020.01)

(52) U.S. Cl.
CPC ............ *G06F 40/117* (2020.01); *G06F 40/14* (2020.01); *G06F 40/154* (2020.01); *G06K 9/00463* (2013.01)

(58) Field of Classification Search
CPC ............ G06F 17/227; G06F 17/30707; G06F 17/30896; G06K 9/00469; G06K 9/00463
USPC .......................................................... 715/234
See application file for complete search history.

(56) References Cited

U.S. PATENT DOCUMENTS

| | | | |
|---|---|---|---|
| 2009/0119374 A1* | 5/2009 | O'Sullivan | H04L 51/043 709/206 |
| 2009/0177959 A1 | 7/2009 | Chakrabarti et al. | |
| 2011/0213655 A1 | 9/2011 | Henkin et al. | |
| 2012/0089622 A1* | 4/2012 | Fan | G06F 17/30675 707/749 |
| 2013/0304730 A1* | 11/2013 | Zhou | G06Q 30/02 707/723 |
| 2014/0122224 A1 | 5/2014 | Lauckhart et al. | |
| 2015/0067476 A1* | 3/2015 | Song | G06F 17/2247 715/234 |
| 2015/0180808 A1* | 6/2015 | Moisa | G06T 11/001 709/206 |
| 2016/0283491 A1* | 9/2016 | Lu | G06F 17/2705 |
| 2017/0063776 A1* | 3/2017 | Nigul | G06F 16/334 |

FOREIGN PATENT DOCUMENTS

| | | |
|---|---|---|
| CN | 104268192 | 1/2015 |
| CN | 104462532 | 3/2015 |
| CN | 105677764 | 6/2016 |

OTHER PUBLICATIONS

International Search Report in PCT/CN2016/386216 dated Oct. 13, 2016 in 3 pages.

* cited by examiner

METHOD AND APPARATUS FOR EXTRACTING INFORMATION

CROSS-REFERENCE TO RELATED APPLICATION

This application is related to and claims priority from Chinese Application No. 201511022937.X, filed on Dec. 30, 2015, the entire disclosure of which is hereby incorporated by reference.

TECHNICAL FIELD

The present disclosure relates generally to the field of computer technology, specifically to the field of information technology, and more specifically to a method and apparatus for extracting information.

BACKGROUND

With the rapid development of the Internet technologies, there are increasingly abundant information resources on the Internet. Search engines provide great convenience to net users to quickly find required information on the Internet. In addition, with the increasing quantity of resources on the Internet and the accumulation of user behavior data in search engines, search engines provide capability to automatically answer questions. Compared with the conventional search engines, the search result of an automatic question answering system is answers directly extracted from related web pages, rather than a list of ordered web pages. The user no longer needs to spend time to search for answers in the web pages, thereby saving time for the user.

A content indexed by an automatic question answering system is no longer the content of an entire web page, but a paragraph or several sentences comprising a question and an answer in the content of the web page. As only a small quantity of resources naturally existed on the Internet comprise questions and answers, there is a need to extract information comprising questions and answers from the contents of web pages.

SUMMARY

An objective of the present application is to provide an improved method and apparatus for extracting information, in order to solve the technical problem mentioned in the foregoing Background section.

According to a first aspect, the present application provides a method for extracting information, comprising: parsing a pre-acquired web page file into a structure of a tag tree, and recognizing, in nodes of the tag tree, at least one body node at which a web page body in the web page file is located; performing a paragraph division on a content contained in the at least one body node to generate paragraph blocks, and setting a tag attribute for each paragraph block according to an attribute of a tag associated with the each paragraph block; classifying a text content contained in the each paragraph block based on the tag attribute of the each paragraph block; and extracting information comprising a question and an answer from the text content contained in the each paragraph block based on a classification result.

In some embodiments, the performing a paragraph division on a content contained in the at least one body node to generate paragraph blocks comprises: recognizing, in the content contained in the at least one body node, a title of a web page content of the web page file; and performing the paragraph division on a content other than the title in the content contained in the at least one body node to generate the paragraph blocks.

In some embodiments, the parsing a pre-acquired web page file into a structure of a tag tree, and recognizing, in nodes of the tag tree, at least one body node at which a web page body in the web page file is located comprises: standardizing the pre-acquired web page file, causing the web page file to conform to a Hyper Text Markup Language specification; performing document object model tree parsing on the standardized web page file to generate the tag tree; and accessing the nodes of the tag tree, and determining a body node according to contents contained in the nodes.

In some embodiments, the recognizing, in the content contained in the at least one body node, a title of a web page content of the web page file comprises: selecting at least one candidate title node from the at least one body node based on a location of the content contained in the at least one body node in the web page content; and calculating an edit distance between a text inside each candidate title node and a text corresponding to a title tag of the web page file and an edit distance between the text inside the each candidate title node and a text corresponding to an anchor tag; sorting the candidate title nodes according to tag information inside the candidate title nodes and the calculated edit distances; and determining a body title node in the at least one candidate title node based on a sorting result, and determining a text inside the body title node as the title of the web page content.

In some embodiments, the performing a paragraph division on a content contained in the at least one body node to generate paragraph blocks, and setting a tag attribute for each paragraph block according to an attribute of a tag associated with the each paragraph block comprises: recognizing at least one block element in each body node; performing the paragraph division on a text contained in the body node by using the subblock element and a new line tag if the block element comprises a subblock element; or, performing the paragraph division on a text contained in the body node by using a new line tag, to obtain at least one paragraph block; and setting a tag attribute for each paragraph block according to an attribute of an associated tag in the block element and the subblock element.

In some embodiments, the classifying a text content contained in the each paragraph block based on the tag attribute of the each paragraph block comprises: grouping paragraph blocks having an identical tag attribute into a given paragraph block set; recognizing, based on a number of characters contained in each paragraph block in each paragraph block set and a line spacing between the paragraph blocks, a short title structure in each block set; and classifying a paragraph block having a non-short title structure in the each paragraph block set based on a text contained therein.

In some embodiments, the extracting information comprising a question and an answer from the text content contained in the each paragraph block based on a classification result comprises: performing a logical block division on a web page body content corresponding to the web page file based on the recognized short title structure; determining, by using a regular expression, whether each short title structure is a question, and if yes, setting the each short title as a candidate question; extracting a candidate answer corresponding to the candidate question based on a location of the candidate question in the web page content and a logical block division result of the web page content; and extracting information comprising a question and an answer based on at least one of a number of lines by which the candidate question and the candidate answer are spaced apart from each other, whether numerical symbols in the candidate answer are consecutive, a number of answer entries, and a number of answer entries determined as questions.

According to a second aspect, the present application provides an apparatus for extracting information, comprising: a parsing unit, configured to parse a pre-acquired web page file into a structure of a tag tree, and recognize, in nodes of the tag tree, at least one body node at which a web page body in the web page file is located; a division unit, configured to perform a paragraph division on a content contained in the at least one body node to generate paragraph blocks, and set a tag attribute for each paragraph block according to an attribute of a tag associated with the each paragraph block; a classification unit, configured to classify a text content contained in the each paragraph block based on the tag attribute of the each paragraph block; and an extraction unit, configured to extract information comprising a question and an answer from the text content contained in the each paragraph block based on a classification result.

In some embodiments, the division unit comprises: a recognition subunit, configured to recognize, in the content contained in the at least one body node, a title of a web page content of the web page file; and a division subunit, configured to perform the paragraph division on a content other than the title in the content contained in the at least one body node to generate the paragraph blocks.

In some embodiments, the parsing unit is further configured to: standardize the pre-acquired web page file, causing the web page file to conform to a Hyper Text Markup Language specification; perform document object model tree parsing on the standardized web page file to generate the tag tree; and access the nodes of the tag tree, and determine a body node according to contents contained in the nodes.

In some embodiments, the recognition subunit is further configured to: select at least one candidate title node from the at least one body node based on a location of the content contained in the at least one body node in the web page content; and calculate an edit distance between a text inside each candidate title node and a text corresponding to a title tag of the web page file and an edit distance between the text inside the each candidate title node and a text corresponding to an anchor tag; sort the candidate title nodes according to tag information inside the candidate title nodes and the calculated edit distances; and determine a body title node in the at least one candidate title node based on a sorting result, and determine a text inside the body title node as the title of the web page content.

In some embodiments, the division unit is further configured to: recognize at least one block element in each body node; perform the paragraph division on a text contained in the body node by using the subblock element and a new line tag if the block element comprises a subblock element; or, perform the paragraph division on a text contained in the body node by using a new line tag, to obtain at least one paragraph block; and set a tag attribute for each paragraph block according to an attribute of an associated tag in the block element and the subblock element.

In some embodiments, the classification unit is further configured to: group paragraph blocks having an identical tag attribute into a given paragraph block set; recognize, based on a number of characters contained in each paragraph block in each paragraph block set and a line spacing between the paragraph blocks, a short title structure in each block set; and classify a paragraph block having a non-short title structure in the each paragraph block set based on a text contained therein.

In some embodiments, the extraction unit is further configured to: perform a logical block division on a web page body content corresponding to the web page file based on the recognized short title structure; determine, by using a regular expression, whether each short title structure is a question, and if yes, set the each short title as a candidate question; extract a candidate answer corresponding to the candidate question based on a location of the candidate question in the web page content and a logical block division result of the web page content; and extract information comprising a question and an answer based on at least one of a number of lines by which the candidate question and the candidate answer are spaced apart from each other, whether numerical symbols in the candidate answer are consecutive, a number of answer entries, and a number of answer entries determined as questions.

The method and apparatus for extracting information provided by the present application implement the automatic and precise extraction of information by parsing a web page file into a structure of a tag tree, then performing a paragraph division on a content contained in a body node to generate paragraph blocks, and finally classifying a text content contained in the each paragraph block and extracting information comprising a question and an answer from the text content contained in the each paragraph block based on a classification result.

BRIEF DESCRIPTION OF THE DRAWINGS

Other features, objectives and advantages of the present application will become more apparent upon reading the detailed description to non-limiting embodiments with reference to the accompanying drawings.

DETAILED DESCRIPTION OF EMBODIMENTS

The present application will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
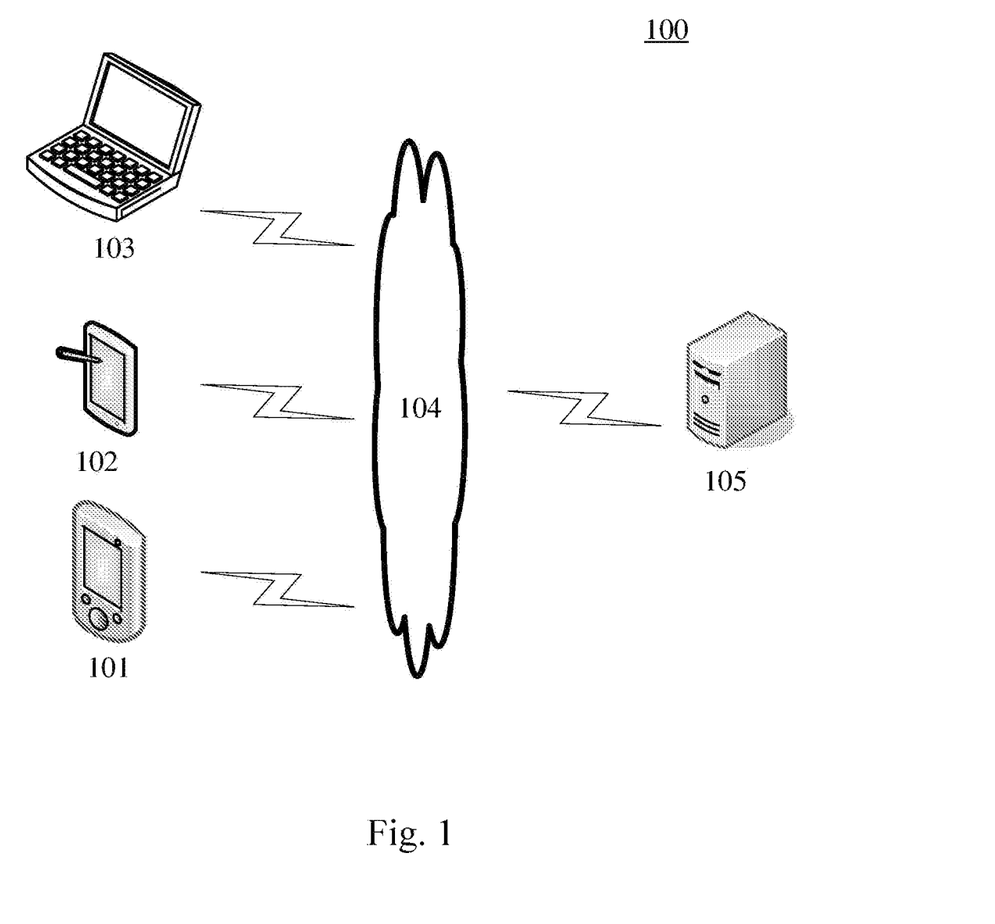
FIG. 1 is an architectural diagram of an exemplary system in which the present application may be implemented.

FIG. 1 shows an exemplary architecture of a system 100 which may be used by a method for extracting information or an apparatus for extracting information according to the embodiments of the present application.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user 110 may use the terminal devices 101, 102 and 103 to interact with the server 105 through the network 104, in order to transmit or receive messages, etc. Various communication client applications, such as web browser applications, search applications, news applications, instant messaging tools, mailbox clients, and social platform software, may be installed on the terminal devices 101, 102 and 103.

The terminal devices 101, 102 and 103 may be various electronic devices capable of supporting information processing, including but not limited to, smart phones, tablet computers, e-book readers, MP3 (Moving Picture Experts Group Audio Layer III) players, MP4 (Moving Picture Experts Group Audio Layer IV) players, laptop computers and desktop computers.

The server 105 may be a server providing various services, for example, a backend web page server for providing web page file information to the terminal devices 101, 102 or 103. The backend web page server may send a web page file on the internet to the terminal devices, or may analyse and extract information from a web page file on the internet, and send a processed result to the terminal devices.

It should be noted that the method for extracting information provided in the embodiments of the present application may be executed by the server 105 independently, jointly executed by the terminal devices 101, 102 and 103 and the server 105, or executed by the terminal devices 101, 102 and 103 independently. Correspondingly, an apparatus for extracting information may be disposed in the terminal devices 101, 102 and 103 or may be disposed in the server 105, or some units of the apparatus for extracting information may be disposed in the server 105.

It should be understood that the numbers of the terminal devices, the networks and the servers in FIG. 1 are merely schematic. There may be any number of terminal devices, any number of networks and any number of servers as required in practice.

Figure 2:
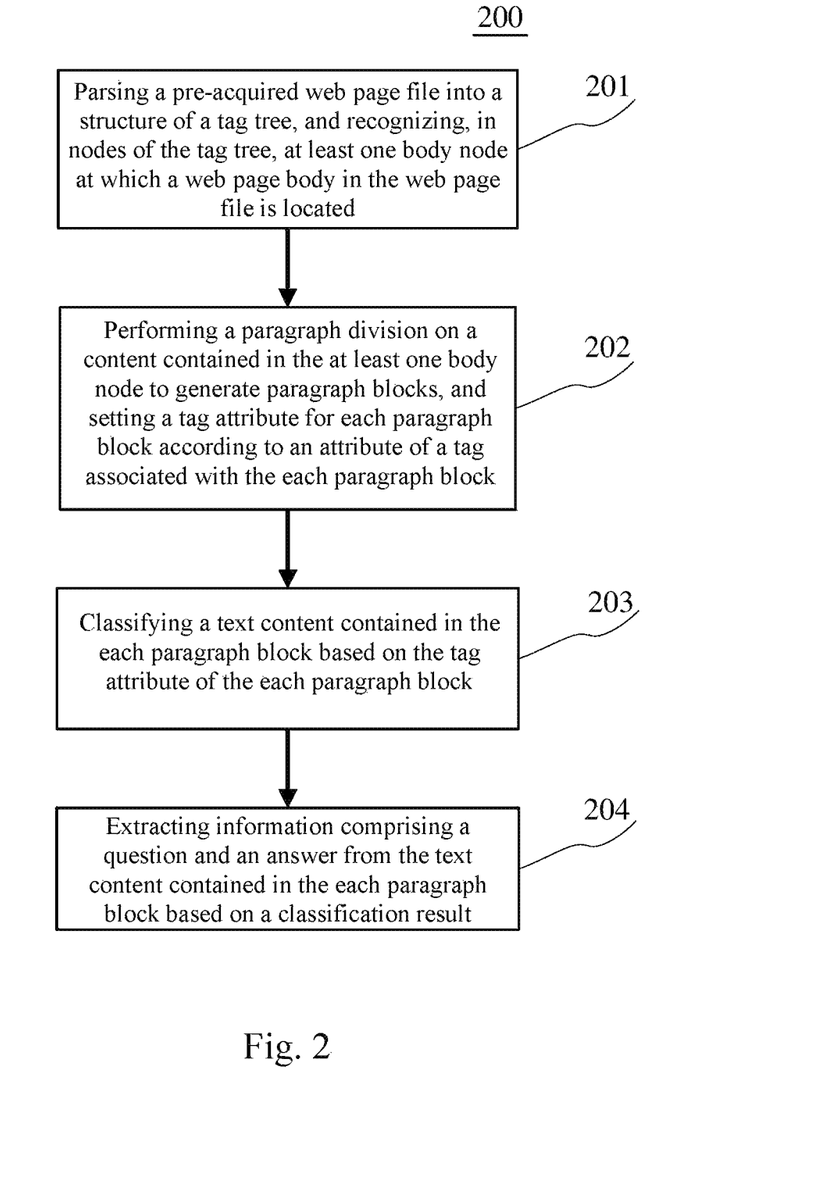
FIG. 2 is a schematic flowchart of a method for extracting information according to an embodiment of the present application.

Referring to FIG. 2, a process 200 according to an embodiment of a method for extracting information of the present application is illustrated. The flow 200 of the method for extracting information comprises the following steps:

At step 201, a pre-acquired web page file is parsed into a tag tree structure, and at least one node at which a web page body in the web page file is located is recognized in nodes of the tag tree.

In this embodiment, an electronic device on which the method for extracting information runs may locally or remotely acquire a web page file in advance. For example, when the above-mentioned electronic device is a web page server, it may locally acquire a web page file; when the above-mentioned electronic device is a mobile terminal, it may acquire a web page file from a web page server in a wired or wireless connection manner. The above-mentioned web page file may be a file of any format such as an HTML format, an XHTML format, a DHTML format, an ASP format, a PHP format, a JSP format, an SHTML format, an NSP format, and an XML format. The above-mentioned electronic device may parse the web page file into a structure of a tag tree, that is, organize tags in the web page file into a tree structure according to a nesting relation. The above-mentioned electronic device may further perform filtering on the obtained tag tree, to remove nodes at which information irrelevant to the web page body is located. The above-mentioned information irrelevant to the web page body may include but not limited to, navigation information, copyright notice information, advertisement information. The above-mentioned electronic device may further recognize, in nodes of the tag tree according to contents contained in the nodes, at least one body node at which the web page body is located, for example, recognize a node including a text having more than a preset number of words and a link text having less than a preset number of words as a body node. It should be noted that the above-mentioned wireless connection manner may include but not limited to, 3G/4G connection, WiFi connection, Bluetooth connection, WiMAX connection, Zigbee connection, ultra wideband (UWB) connection, and other known or future developed wireless connection method.

In some optional implementations of this embodiment, the above-mentioned electronic device may firstly standardize the pre-acquired web page file, causing the web page file to conform to a Hyper Text Markup Language specification, for example, add </title> to a web page file that has only a <title> tag and does not have a corresponding </title> tag, or add a closing tag such as <li> and <hr>; then perform document object model (DOM) tree parsing on the standardized web page file to generate the tag tree; and finally, sequentially access the nodes of the generated tag tree, and determine a body node according to contents contained in the nodes. For example, the above-mentioned electronic device may respectively collect statistics regarding a number of text words, a number of link text words and a number of paragraphs contained in each node of the tag tree, a variance of a number of texts in a leaf node contained in each node; compare the statistics with preset thresholds; and select a node that satisfies a certain condition as the body node. For example, a node having a large number of text words, a small number of link text words, a large number of paragraphs, and a large variance of a number of texts in a leaf node contained therein is recognized as the body node.

At step 202, a paragraph division is performed on a content contained in the at least one body node to generate paragraph blocks, and a tag attribute is set for each paragraph block according to an attribute of a tag associated with the each paragraph block.

In this embodiment, the above-mentioned electronic device may perform a paragraph division on a text content contained in the at least one body node to generate paragraph blocks, where each paragraph block corresponds to a paragraph in the web page body corresponding to the above-mentioned web page file; and set a tag attribute for each paragraph block according to an attribute (for example, color, strong, link, numeric list, non-numeric list) of a tag associated with the each paragraph block.

In some optional implementations of this embodiment, the above-mentioned electronic device may firstly recognize, in the content contained in the at least one body node, a title of web page content of the web page file, for example, recognize the title of the web page content of the above-mentioned web page file from the at least one body node obtained at step 201 based on a location of the content contained in each node in the web page body corresponding to the above-mentioned web page file and a text content contained in each node; and then perform the paragraph division on a content other than the title in the content contained in the at least one body node to generate the paragraph blocks.

Optionally, the above-mentioned electronic device may firstly select at least one candidate title node from the at least one body node based on a location of the content contained in the at least one body node in the web page content, for example, find nodes corresponding to text contents within a preset range in the web page content and use the found nodes as candidate title nodes; afterward, calculate an edit distance between a text inside each candidate title node and a text corresponding to a title tag of the web page file and an edit distance between the text inside the each candidate title node and a text corresponding to an anchor tag; then, sort the candidate title nodes according to tag information inside the candidate title nodes and the calculated edit distances, for example, sort the candidate title nodes in ascending order of the edit distances; and finally, determine a body title node in the at least one candidate title node based on a sorting result, and determine a text inside the body title node as the title of the web page content. Optionally, the above-mentioned electronic device may further determine a body title node in the at least one candidate title node based on a sorting result and a tag associated with each candidate title node, for example, select a candidate title node containing a tag such as a head tag (H tag) and a strong tag that easily appears in a title and having an edit distance less than a preset value as the body title node.

In some optional implementations of this embodiment, the above-mentioned electronic device may firstly recognize at least one block element in each body node; perform the paragraph division on a text contained in the body node by using the subblock element and a new line (br) tag if the block element contains a subblock element; or, perform the paragraph division on a text contained in the body node by using a new line tag, to obtain at least one paragraph block; and then set a tag attribute for each paragraph block according to an attribute (for example, color, strong, link, numeric list, non-numeric list, etc.) of an associated tag in the block element and the subblock element.

At step 203, a text content contained in the each paragraph block is classified based on the tag attribute of the each paragraph block.

In this embodiment, the above-mentioned electronic device may classify a text content contained in the each paragraph block based on the paragraph blocks and the tag attributes of the paragraph blocks obtained at step 202. For example, paragraph blocks having an identical tag attribute may be classified as a given category.

At step 204, information comprising a question and an answer is extracted from the text content contained in the paragraph block based on a classification result.

In this embodiment, the above-mentioned electronic device may analyze the classification result obtained at step 203 by using an existing natural language processing and analysis technology, and extract a question from the text content contained in each paragraph block, for example, perform a series of processing including segmentation and semantic parsing on the text content contained in each paragraph block and extract an interrogative sentence from the text content contained in each paragraph block. After extracting the question, the above-mentioned electronic device may extract an answer corresponding to the question based on a location of the extracted question in the web page content and the text content contained in each paragraph block.

Figure 3:
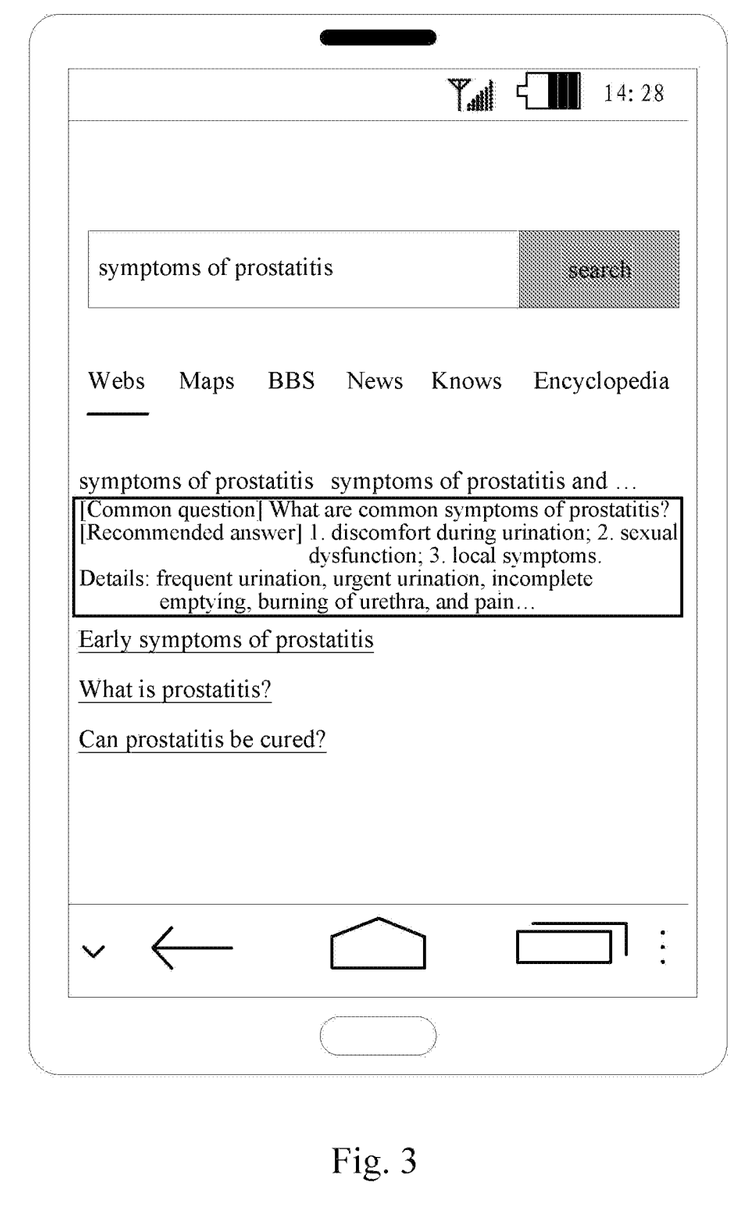
FIG. 3 is a schematic flowchart of an application scenario of the method for extracting information according to an embodiment of the present application.

Further, referring to FIG. 3, FIG. 3 is a schematic diagram of an application scenario of the method for extracting information according to this embodiment. In the application scenario of FIG. 3, a user who is using a terminal device to browse web pages enters a question "symptoms of prostatitis" to search for answers; a web page server may search multiple pieces of prestored information comprising questions and answers for questions and answers associated with the question "symptoms of prostatitis", and push the found questions and answers to the user, as shown in FIG. 3. The multiple pieces of prestored information comprising questions and answers are acquired in the following manner: firstly, parsing a pre-acquired web page file into a structure of a tag tree, and recognizing, in the tag tree, at least one body node at which a web page body of the web page file is located; then, performing a paragraph division on a body content to generate paragraph blocks, and setting a tag attribute for the each paragraph block; and finally, classifying a text content contained in each paragraph block, and extracting a question and an answer contained in the web page content from the text content based on a classification result.

The method provided in the embodiment of the present application implements an automatic and precise extraction of information by parsing a web page file into a tag tree, performing a paragraph division on a content contained in a recognized body node and setting a tag attribute, and finally extracting information comprising a question and an answer contained in the web page body.

Figure 4:
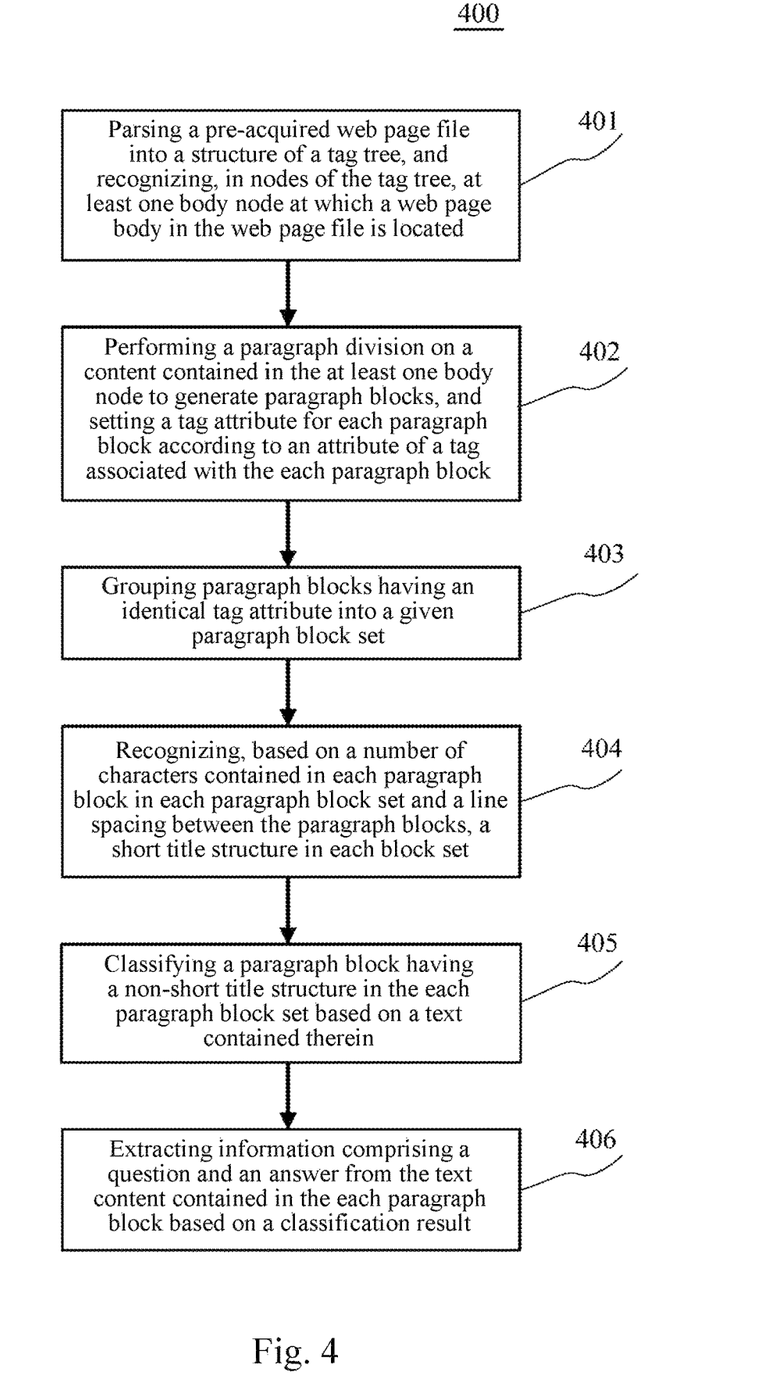
FIG. 4 is a schematic flowchart of a method for extracting information according to another embodiment of the present application.

Further, referring to FIG. 4, a flow 400 of a method for extracting information according to another embodiment of the present application is illustrated. The flow 400 of the method for extracting information comprises the following steps:

At step 401, a pre-acquired web page file is parsed into a structure of a tag tree, and at least one body node at which a web page body in the web page file is located is recognized in nodes of the tag tree.

In this embodiment, an electronic device on which the method for extracting information runs may locally or remotely acquire a web page file in advance, and parse the web page file into a structure of a tag tree. Then, the above-mentioned electronic device may further recognize, in nodes of the tag tree according to contents contained in the nodes, at least one body node at which a web page body is located.

At step 402, a paragraph division is performed on a content contained in the at least one body node to generate paragraph blocks, and a tag attribute is set for each paragraph block according to an attribute of a tag associated with the each paragraph block.

In this embodiment, the above-mentioned electronic device may perform a paragraph division on a text content contained in the at least one body node to generate paragraph blocks, and set a tag attribute for each paragraph block according to an attribute of a tag associated with the each paragraph block.

At step 403, paragraph blocks having an identical tag attribute are grouped into a given paragraph block set.

In this embodiment, the above-mentioned electronic device may group paragraph blocks having an identical tag attribute in the paragraph blocks obtained at step 402 into a given paragraph block set.

At step 404, based on a number of characters contained in each paragraph block in each paragraph block set and a line spacing between the paragraph blocks, a short title structure in each block set is recognized.

In this embodiment, the above-mentioned electronic device may calculate an average line spacing between paragraph blocks, a maximum number of consecutive line spacings, an average number of characters, a maximum number of characters and the like in each paragraph block set, set corresponding thresholds, and recognize a paragraph block having a given line spacing and a uniform character length that is not much long, as a short title structure.

At step 405, a paragraph block having a non-short title structure in each paragraph block set is classified based on a text contained therein.

In this embodiment, the above-mentioned electronic device may classify a paragraph block having a non-short title structure in each paragraph block set based on a text contained therein, for example, classify a paragraph block as a numbered key-value paragraph, a key-value paragraph, a numbered paragraph, an ordinary paragraph and the like according to whether a text in the paragraph block includes a numeral and whether there is an emphatic structure at the beginning of the paragraph. The above-mentioned numbered key-value paragraph is a numbered paragraph that has a key-value structure (for example: 1. Method of refining the central idea: Understanding essence through appearance).

At step 406, information comprising a question and an answer is extracted from the text content contained in the paragraph block based on a classification result.

In this embodiment, the above-mentioned electronic device may extract a question and an answer corresponding to the question from the text content contained in each paragraph block based on a classification result obtained at step 405.

In some optional implementations of this embodiment, the above-mentioned electronic device may firstly perform a logical block division on a web page body content corresponding to the web page file according to the short title structure recognized at step 404, for example, define a part between the recognized short title structure and a short title structure next to the short title structure as a logical block; afterward, determine, by using a regular expression, whether each short title structure is a question, and if yes, set the each short title as a candidate question; then, extract a candidate answer corresponding to the candidate question based on a location of the candidate question in the web page content and a logical block division result of the web page content; and finally, extract information comprising a question and an answer based on at least one of a number of lines by which the candidate question and the candidate answer are spaced apart from each other, whether numerical symbols in the candidate answer are consecutive, a number of answer entries, and a number of answer entries determined as questions. For example, when a number of lines between a candidate question and the first content of a candidate answer exceeds a predetermined threshold, the candidate question and the candidate answer are removed; when a candidate answer contains multiple contents with inconsecutive numerical symbols, the candidate answer and a candidate question corresponding to the candidate answer are removed; when a number of answer entries contained in a candidate answer is less than a set threshold, the candidate answer and a candidate question corresponding to the candidate answer are removed. The number of answer entries may be a number of entries contained in the answer, and each entry may refer to a paragraph or a sentence. When multiple answer entries contained in a candidate answer are determined as questions (for example, determined as interrogative sentences), the candidate answer and a candidate question corresponding to the candidate answer are removed.

As can be seen from FIG. 4, compared with the embodiment corresponding to FIG. 2, the flow 400 of the method for extracting information in this embodiment highlights the division of paragraph blocks and the recognition of the short title structure in each block set. Whereby, the solution described in this embodiment can more precisely recognize a question in the web page content, thereby implementing a precise extraction of information.

Figure 5:
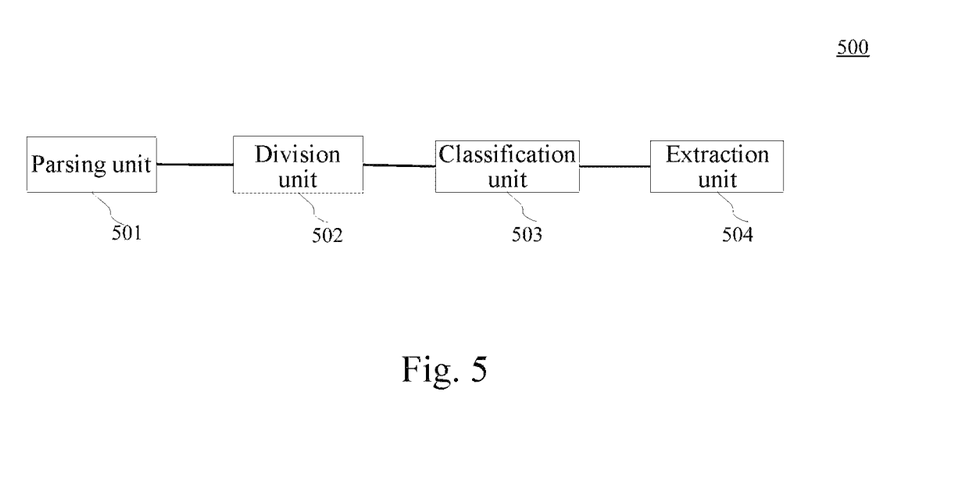
FIG. 5 illustrates a structural schematic diagram of an apparatus for extracting information according to an embodiment of the present application.

Further, referring to FIG. 5, as an implementation of the methods shown in the above-mentioned figures, the present application provides an embodiment of an apparatus for extracting information. This apparatus embodiment corresponds to the method embodiment shown in FIG. 2. The apparatus may be specifically applied to various electronic devices.

As shown in FIG. 5, the apparatus for extracting information 500 according to this embodiment comprises: a parsing unit 501, a division unit 502, a classification unit 503 and an extraction unit 504. The parsing unit 501 is configured to parse a pre-acquired web page file into a structure of a tag tree, and recognize, in nodes of the tag tree, at least one body node at which a web page body in the web page file is located. The division unit 502 is configured to perform a paragraph division on a content contained in the at least one body node to generate paragraph blocks, and set a tag attribute for each paragraph block according to an attribute of a tag associated with the each paragraph block. The classification unit 503 is configured to classify a text content contained in the each paragraph block based on the tag attribute of the each paragraph block. The extraction unit 504 is configured to extract information comprising a question and an answer from the text content contained in the each paragraph block based on a classification result.

In this embodiment, the parsing unit 501 in the apparatus for extracting information 500 may parse a pre-acquired web page file into a structure of a tag tree, and recognize, in nodes of the tag tree, at least one body node at which a web page body in the web page file is located.

In this embodiment, the division unit 502 may perform a paragraph division on a content contained in the at least one body node to generate paragraph blocks, and set a tag attribute for each paragraph block according to an attribute of a tag associated with the each paragraph block.

In this embodiment, the classification unit 503 may classify a text content contained in the each paragraph block based on the tag attribute of the each paragraph block obtained by the division unit 502.

In this embodiment, the extraction unit 504 may extract information comprising a question and an answer from the text content contained in the each paragraph block based on a classification result obtained by the classification unit 503.

It should be understood by those skilled in the art that the apparatus for extracting information 500 further includes other well-known structures, for example, a processor and a memory. Such well-known structures are not shown in FIG. 5 so as to not unnecessarily obscure the embodiments of the present application.

Figure 6:
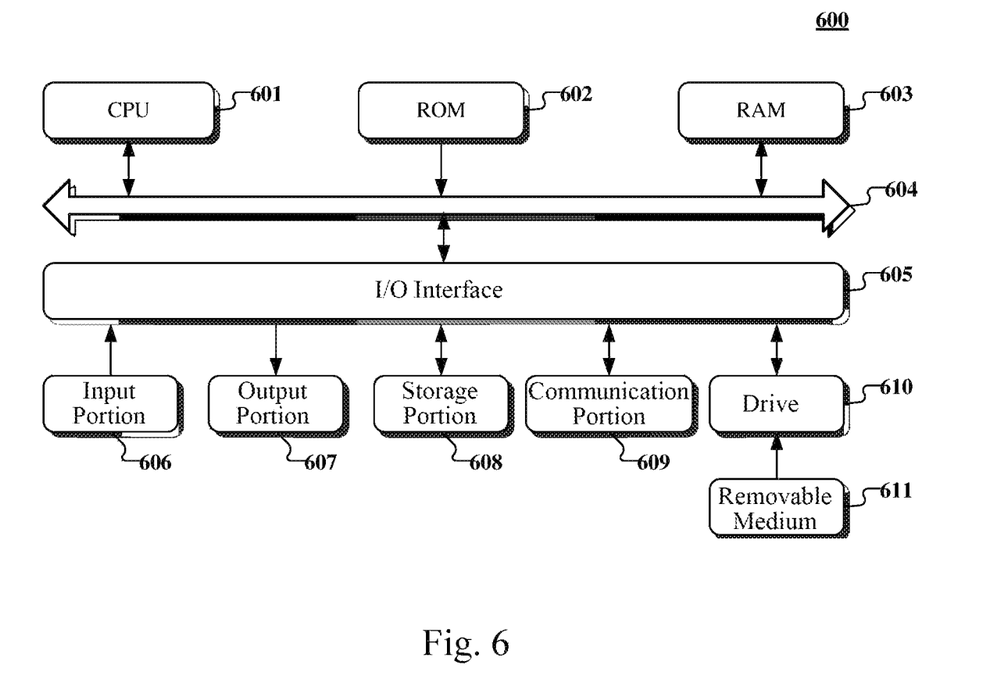
FIG. 6 illustrates a structural schematic diagram of a computer system adapted to implement a terminal device or a server of the embodiments of the present application.

Referring to FIG. 6, a schematic structural diagram of a computer system 600 adapted to implement a terminal apparatus or a server of the embodiments of the present application is shown.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, and/or may be installed from the removable media 611.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present application may be implemented by means of software or hardware. The described units or modules may also be provided in a processor, for example, described as: a processor, comprising a parsing unit, a division unit, a classification unit and an extraction unit, where the names of these units or modules do not in some cases constitute a limitation to such units or modules themselves. For example, the parsing unit may also be described as "a unit for parsing a pre-acquired web page file into a structure of a tag tree, and recognizing, in nodes of the tag tree, at least one body node at which a web page body in the web page file is located."

In another aspect, the present application further provides a non-volatile computer storage medium. The non-volatile computer storage medium may be the non-volatile computer storage medium included in the apparatus in the above described embodiments, or a stand-alone non-volatile computer storage medium not assembled into the apparatus. The non-volatile computer storage medium stores one or more programs. The one or more programs, when executed by a device, cause the device to: parse a pre-acquired web page file into a structure of a tag tree, and recognizing, in nodes of the tag tree, at least one body node at which a web page body in the web page file is located; perform a paragraph division on a content contained in the at least one body node to generate paragraph blocks, and setting a tag attribute for each paragraph block according to an attribute of a tag associated with the each paragraph block; classify a text content contained in the each paragraph block based on the tag attribute of the each paragraph block; and extract information comprising a question and an answer from the text content contained in the each paragraph block based on a classification result.

The above description only provides an explanation of the preferred embodiments of the present application and the technical principles used. It should be appreciated by those skilled in the art that the inventive scope of the present application is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present application are examples.

What is claimed is:

1. A method for extracting information, comprising:

parsing a pre-acquired web page file into a structure of a tag tree, and recognizing, in nodes of the tag tree, at least one body node at which a web page body in the web page file is located;

performing a paragraph division on a content contained in the at least one body node to generate paragraph blocks, and setting a tag attribute for each paragraph block according to an attribute of a tag associated with the each paragraph block;

classifying a text content contained in the each paragraph block based on the tag attribute of the each paragraph block;

extracting a candidate question and a candidate answer corresponding to the question from the text content; and extracting information comprising a question and an answer from the text content contained in the each paragraph block based on a classification result, comprising removing the candidate answer and the candidate question based on at least one of a number of lines by which the candidate question and the candidate answer are spaced apart from each other, numerical symbols in the candidate answer, a number of answer entries, and a number of answer entries determined as questions, wherein the removing the candidate answer and the candidate question based on at least one of a number of lines by which the candidate question and the candidate answer are spaced apart from each other, numerical symbols in the candidate answer, a number of answer entries, and a number of answer entries determined as questions comprises:
removing the candidate answer and the candidate question when the numerical symbols contained in the candidate answer are inconsecutive,
wherein the performing a paragraph division on a content contained in the at least one body node to generate paragraph blocks comprises:
   recognizing, in the content contained in the at least one body node, a title of a web page content of the web page file; and
   performing the paragraph division on a content other than the title in the content contained in the at least on body node to generate the paragraph blocks,
wherein the recognizing, in the content contained in the at least one body node, a title of a web page content of the web page file comprises:
   selecting at least one candidate title node from the at least one body node based on a location of the content contained in the at least on body node in the web page content;
   calculating an edit distance between a text inside each candidate title node and a text corresponding to a title tag of the web page file and an edit distance between the text inside the each candidate title node and a text corresponding to an anchor tag;
   sorting the candidate title nodes according to tag information inside the candidate title nodes and the calculated edit distances; and
   determining a body title node in the at least one candidate title node based on the sorting results, and determining a text inside the body title node as the title of the we page content.

2. The method according to claim 1, wherein the parsing a pre-acquired web page file into a structure of a tag tree, and recognizing, in nodes of the tag tree, at least one body node at which a web page body in the web page file is located comprises:
   standardizing the pre-acquired web page file, causing the web page file to conform to a Hyper Text Markup Language specification;
   performing document object model tree parsing on the standardized web page file to generate the tag tree; and
   accessing the nodes of the tag tree, and determining a body node according to contents contained in the nodes.

3. The method according to claim 1, wherein the performing a paragraph division on a content contained in the at least one body node to generate paragraph blocks, and setting a tag attribute for each paragraph block according to an attribute of a tag associated with the each paragraph block comprises:
   recognizing at least one block element in each body node;
   performing the paragraph division on a text contained in the body node by using a subblock element and a new line tag if the block element contains the subblock element; or, performing the paragraph division on a text contained in the body node by using a new line tag, to obtain at least one paragraph block; and
   setting a tag attribute for each paragraph block according to an attribute of an associated tag in the block element and the subblock element.

4. The method according to claim 1, wherein the classifying a text content contained in the each paragraph block based on the tag attribute of the each paragraph block comprises:
   grouping paragraph blocks having an identical tag attribute into a given paragraph block set;
   recognizing, based on a number of characters contained in each paragraph block in each paragraph block set and a line spacing between the paragraph blocks, a short title structure in each block set; and
   classifying a paragraph block having a non-short title structure in the each paragraph block set based on a text contained therein.

5. The method according to claim 4, wherein the extracting information comprising a question and an answer from the text content contained in the each paragraph block based on a classification result comprises:
   performing a logical block division on a web page body content corresponding to the web page file based on the recognized short title structure;
   determining, by using a regular expression, whether each short title structure is a question, and if yes, setting the each short title as the candidate question; and
   extracting the candidate answer corresponding to the candidate question based on a location of the candidate question in the web page content and a logical block division result of the web page content.

6. An apparatus for extracting information, comprising:
at least one processor; and
a memory storing instructions, which when executed by the at least one processor, cause the at least one processor to perform operations, the operations comprising:
parsing a pre-acquired web page file into a structure of a tag tree, and recognizing, in nodes of the tag tree, at least one body node at which a web page body in the web page file is located;
performing a paragraph division on a content contained in the at least one body node to generate paragraph blocks, and setting a tag attribute for each paragraph block according to an attribute of a tag associated with the each paragraph block;
classifying a text content contained in the each paragraph block based on the tag attribute of the each paragraph block;
extracting a candidate question and a candidate answer corresponding to the question from the text content; and
extracting information comprising a question and an answer from the text content contained in the each paragraph block based on a classification result, comprising removing the candidate answer and the candidate question based on at least one of a number of lines by which the candidate question and the candidate answer are spaced apart from each other, numerical symbols in the candidate answer, a number of answer entries, and a number of answer entries determined as questions,
wherein the removing the candidate answer and the candidate question based on at least one of a number of lines by which the candidate question and the candidate answer are spaced apart from each other, numerical symbols in the candidate answer, a number of answer entries, and a number of answer entries determined as questions comprises:

removing the candidate answer and the candidate question when the numerical symbols contained in the candidate answer are inconsecutive, wherein the performing a paragraph division on a content contained in the at least one body node to generate paragraph blocks comprises:
recognizing, in the content contained in the at least one body node, a title of a web page content of the web page file; and
performing the paragraph division on a content other than the title in the content contained in the at least one body node to generate the paragraph blocks, wherein the recognizing, in the content contained in the at least one body node, a title of a web page content of the web page file comprises:
selecting at least one candidate title node from the at least one body node based on a location of the content contained in the at least one body node in the web page content;
calculating an edit distance between a text inside each candidate title node and a text corresponding to a title tag of the web page file and an edit distance between the text inside the each candidate title node and a text corresponding to an anchor tag;
sorting the candidate title nodes according to tag information inside the candidate title nodes and the calculated edit distance; and
determining a body title node in the at least one candidate title node based on the sorting result, and determining a text inside the body title node as the title of the web page content.

7. The apparatus according to claim 6, wherein the parsing a pre-acquired web page file into a structure of a tag tree, and recognizing, in nodes of the tag tree, at least one body node at which a web page body in the web page file is located comprises:
standardizing the pre-acquired web page file, causing the web page file to conform to a Hyper Text Markup Language specification;
performing document object model tree parsing on the standardized web page file to generate the tag tree; and
accessing the nodes of the tag tree, and determining a body node according to contents contained in the nodes.

8. The apparatus according to claim 6, wherein performing a paragraph division on a content contained in the at least one body node to generate paragraph blocks, and setting a tag attribute for each paragraph block according to an attribute of a tag associated with the each paragraph block comprises:
recognizing at least one block element in each body node;
performing the paragraph division on a text contained in the body node by using a subblock element and a new line tag if the block element comprises the subblock element; or, performing the paragraph division on a text contained in the body node by using a new line tag, to obtain at least one paragraph block; and
setting a tag attribute for each paragraph block according to an attribute of an associated tag in the block element and the subblock element.

9. The apparatus according to claim 6, wherein classifying a text content contained in the each paragraph block based on the tag attribute of the each paragraph block comprises:
grouping paragraph blocks having an identical tag attribute into a given paragraph block set;
recognizing, based on a number of characters contained in each paragraph block in each paragraph block set and a line spacing between the paragraph blocks, a short title structure in each block set; and
classifying a paragraph block having a non-short title structure in the each paragraph block set based on a text contained therein.

10. The apparatus according to claim 9, wherein the extracting information comprising a question and an answer from the text content contained in the each paragraph block based on a classification result comprises:
performing a logical block division on a web page body content corresponding to the web page file based on the recognized short title structure;
determining, by using a regular expression, whether each short title structure is a question, and if yes, setting the each short title as the candidate question; and
extracting the candidate answer corresponding to the candidate question based on a location of the candidate question in the web page content and a logical block division result of the web page content.

11. A non-transitory computer storage medium, storing computer readable instructions executable by a processor, the computer readable instructions when executed by the processor, causing the processor to execute a method for extracting information, the method comprising:
parsing a pre-acquired web page file into a structure of a tag tree, and recognizing, in nodes of the tag tree, at least one body node at which a web page body in the web page file is located;
performing a paragraph division on a content contained in the at least one body node to generate paragraph blocks, and setting a tag attribute for each paragraph block according to an attribute of a tag associated with the each paragraph block;
classifying a text content contained in the each paragraph block based on the tag attribute of the each paragraph block;
extracting a candidate question and a candidate answer corresponding to the question from the text content; and
extracting information comprising a question and an answer from the text content contained in the each paragraph block based on a classification result, comprising removing the candidate answer and the candidate question based on at least one of a number of lines by which the candidate question and the candidate answer are spaced apart from each other, numerical symbols in the candidate answer, a number of answer entries, and a number of answer entries determined as questions,
wherein the removing the candidate answer and the candidate question based on at least one of a number of lines by which the candidate question and the candidate answer are spaced apart from each other, numerical symbols in the candidate answer, a number of answer entries, and a number of answer entries determined as questions comprises:
removing the candidate answer and the candidate question when the numerical symbols contained in the candidate answer are inconsecutive,
wherein the performing a paragraph division on a content contained in the at least one body node to generate paragraph blocks comprises:
recognizing, in the content contained in the at least one body node, a title of a web page content of the web page file; and performing the paragraph division on a content other than the title in the content contained in the at least one body node to generate the paragraph blocks, wherein the recognizing, in the content contained in the at least one body node, a title of a web page content of the web page file comprises:

selecting at least one candidate title node from the at least one body node based on a location of the content contained in the at least one body node in the web page content;

calculating an edit distance between a text inside each candidate title node and a text corresponding to a title tag of the web page file and an edit distances between the text inside the each candidate title node and a text corresponding to an anchor tag;

sorting the candidate title nodes according to tag information inside the candidate title nodes and the calculated edit distances; and determining a body title node in the at least one candidate title node based on a sorting result, and determining a text inside the body title node as the title of the web page content.

12. The method according to claim 1, wherein the removing the candidate answer and the candidate question based on at least one of a number of lines by which the candidate question and the candidate answer are spaced apart from each other, numerical symbols in the candidate answer, a number of answer entries, and a number of answer entries determined as questions comprises:

removing the candidate answer and the candidate question when a number of lines between the candidate question and first content of the candidate answer exceeds a predetermined threshold.

13. The method according to claim 1, wherein the removing the candidate answer and the candidate question based on at least one of a number of lines by which the candidate question and the candidate answer are spaced apart from each other, numerical symbols in the candidate answer, a number of answer entries, and a number of answer entries determined as questions comprises:

removing the candidate answer and the candidate question when the candidate answer contains multiple contents with inconsecutive numerical symbols.

14. The method according to claim 1, wherein the removing the candidate answer and the candidate question based on at least one of a number of lines by which the candidate question and the candidate answer are spaced apart from each other, numerical symbols in the candidate answer, a number of answer entries, and a number of answer entries determined as questions comprises:

removing the candidate answer and the candidate question when a number of answer entries contained in the candidate answer is less than a set threshold.

\* \* \* \* \*

UNITED STATES PATENT AND TRADEMARK OFFICE
CERTIFICATE OF CORRECTION

| | | |
|---|---|---|
| PATENT NO. | : 10,679,051 B2 | Page 1 of 1 |
| APPLICATION NO. | : 15/564187 | |
| DATED | : June 9, 2020 | |
| INVENTOR(S) | : Shouke Qin et al. | |

It is certified that error appears in the above-identified patent and that said Letters Patent is hereby corrected as shown below:

On the Title Page

Column 1, Item (30), Line 1, under Foreign Application Priority Data, delete "2015 1 1022937" and insert --201511022937--.

In the Claims

In Column 13, Line 18, Claim 1, delete "on" and insert --one--.

In Column 13, Line 24, Claim 1, delete "on" and insert --one--.

In Column 13, Line 36 (Approx.), Claim 1, delete "the" and insert --a--.

In Column 13, Line 36 (Approx.), Claim 1, delete "results," and insert --result,--.

In Column 13, Line 38, Claim 1, delete "we" and insert --web--.

In Column 15, Line 27, Claim 6, delete "distance;" and insert --distances;--.

In Column 15, Line 29, Claim 6, delete "the" and insert --a--.

In Column 17, Line 13, Claim 11, delete "distances" and insert --distance--.

Signed and Sealed this
Sixth Day of October, 2020

Andrei Iancu
*Director of the United States Patent and Trademark Office*